Patented May 16, 1933

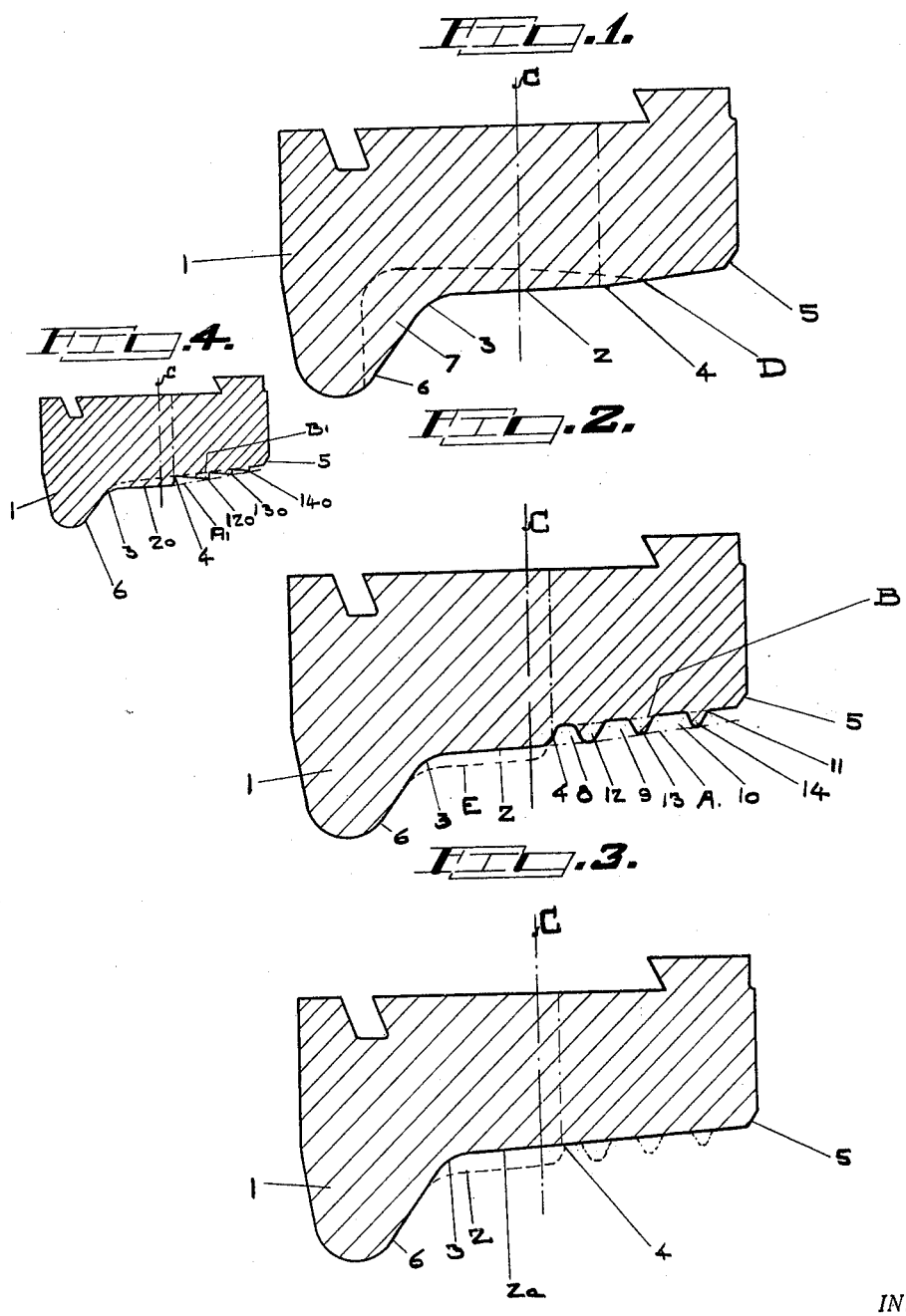

1,909,572

UNITED STATES PATENT OFFICE

GOTTFRIED F. A. CORTS, OF GOTTENBORG, SWEDEN

FLANGED WHEEL FOR RAILWAY VEHICLES

Application filed July 25, 1932, Serial No. 624,569, and in Germany November 7, 1930.

This invention refers itself to the wheels for railway vehicles and especially to the tire of such wheels.

The principal object of this invention is to provide a tire for railway vehicle wheels which will safeguard the smooth running of the railway vehicles notwithstanding the wear and tear on the wheels inflicted upon them from the head of the rails.

Another object of the invention is a tire for railway vehicle wheels which will diminish the result of wearing of the wheels caused by the oscillating of the vehicles when running through curves as well as on straight track due to unavoidable incorrectnesses in the track, to the force of gravity of the vehicle et cetera.

A further object of this invention is a tire for railway vehicle wheels which will stand use during a considerable longer time than wheels of the ordinary design, thus reducing the maintenance costs and increasing the net profit of railway service.

Still another object of this invention is a tire for railway vehicle wheels the operative circumferential surface of which is shaped in steps of varying sizes from the outer side of the wheel to the flange of the tire so that the width and height of the steps both increase in said direction. Thus the step nearest the outer side of the wheel is the narrowest and lowest one while the step situated nearest the flange of the tire is the broadest and highest one. Such steps can be designed either as separate webs running round the wheel parallel to the flange of the tire, or they can resemble ordinary stairs when looked at on an axial cross section of the wheel. In the first mentioned case the interspaces between the individual webs decrease in width from the outer side of the wheel towards the flange, and in the same direction they increase in depth.

The wheels of railway vehicles are limited by their flanges in the movements that are a result of the lateral adjustment of the vehicle when running through curves, the oscillatings arising on the straight track, the unavoidable deviations from the horizontal in the track, the force of gravity of the vehicle, et cetera.

Adjacent the flange, therefore, the wheel runs on practically the same circles at all times, which circles further from geometrical reasons rest on the rails the longest time, due to the fact that they lie at the top of the long waves of the oscillations of the vehicle.

On the outer side of the wheel, that is, on the side remote from the flange, the wheel runs now on one, now on another portion of an extensive zone of the tread, corresponding to the varying width of the gauge in curves and switches and the various large or small unavoidable defects made when laying the track. The head of the rail wears the originally tapering tread of the railway wheel tire more in the neighbourhood of the flange than at the remote or outer edge, so that a taper with a slope opposing the original angle of taper is formed. This opposing taper usually is called the "false tread".

As is well known, it is necessary, however, to maintain a taper all over the surface of the tread which corresponds to the original taper at least therein that its slope lies in the same direction as the original slope, in order to obtain smooth running on the straight (the angle of taper alone should guide the wheel, not the flange), smooth adjustment in curves, least possible wear of wheels and rails, protection for the side of the wheel flange and the inner side of the head of the rail, et cetera, or shortly from reasons of economy, reliability and safety. Therefore, after comparatively short intervals of time the original slope of the tread must be re-dressed by machining the tires, and regulations as to this are included in the statutes of every railway.

Up to now the efforts to prevent the forming of detrimental alterations in the original slope of the tread have consisted in using harder and harder materials for the tires, which has resulted in a detrimental influence on the life of the rail especially on the shape of the head of the rail.

From the view of working and economy it will suffice to use a harder material for the head of the rail to counteract the wear thereof. By this invention the detrimental alterations of the tire will be avoided by giving the tire profile such a shape that the original slope of the taper is automatically maintained by means of the wear that arises in the tire. By this means the wear of the tread on the part farthest away from the flange is made relatively smaller than on the part nearest the flange, resulting therein that with regard to the difference in actual running times the different zones of the surface of the tread are uniformly worn over the whole width.

This can be attained by more or less increasing the unit pressure at the points less or more exposed to wear, so that the longer period of exposure for wear on the portion adjacent the flange is met by the allowance of a correspondingly higher unit pressure on the material adjacent the outer side of the wheel which therefore balance each other.

The increase of the unit pressure towards that side of the tread farthest away from the flange can be attained by suitably stepping the profile of the operative surface in the tire or by providing grooves in the tread, running parallel round the wheels in such a manner that the width and height of the steps or of the webs increase from the outer side of the wheel towards the flange of the tire. When forming webs in the tire, the interspaces or grooves between the webs decrease in width in the aforesaid direction but their depth increases, naturally, just as the height of the webs.

In the accompanying drawing

Figure 1 is a cross section through a portion of a wheel tire of the ordinary design showing in dotted line how the profile has been worn after use, Figure 2 is a similar cross section but with the profile designed in accordance with an embodiment of this invention, Figure 3 the same cross section as in Figure 2 illustrating the result of the wear, and Figure 4 on a decreased scale a similar cross section of the tire but designed in accordance with another embodiment of this invention.

In the figures, 1 designates the flange of the tire and 2 the operative surface of the tire. In the ordinary profile according to Figure 1 the ordinary slope of the operative surface 2 when new is some 1/20 between the curved flange corner 3 and the point 4, and some 1/10 from point 4 to the outer edge 5. On account of the aforesaid reason the operative surface 2 becomes worn more on the portion 3—4 as well as on the inner side 6 of the flange 1 than on the rest 4—5 of the surface. The expression inner side of the flange is meant that side which is directed against the rail, while the outer edge 5 of the tire means that edge of the tire which is directed off from the rail. In Figure 1 the surface 7 enclosed by the full drawn and the dotted profile lines indicates the magnitude of the wear resulting in a ridge at point 4 which customarily is called a "false flange" and makes the operation of the tire inconvenient.

In Figure 2 the improved tire profile is illustrated by way of example. The flange 1 is of the same design as in Figure 1, and the operative surface 2 has the same slope of 1/20 between the curved corner 3 and the point 4. From the last mentioned point to the outer edge 5 the plain surface 2 is imaginable with the same slope 1/10 as in Figure 1 and substituted by a series of grooves 8, 9, 10, 11 running parallel with the flange 1 around the rim separated by partition walls or webs 12, 13, 14 the apex of which webs touch the imaginable portion of surface 2 with the slope 1/10, such as illustrated by the dot and dash line A in Figure 2. The bottom of all the grooves 8—11 also touch a common dot and dash line B in Figure 2, which line converges towards the line A under a rather small angle showing that the depth of the grooves 8—11 or, which will be the same, the height of the webs 12—14 decrease in the direction towards the outer side of the wheel. The width of the grooves 8—11 decreases from the outer edge 5 of the tire towards the point 4, while the thickness of the webs 12—14 increases in the same direction as can be clearly seen in Figure 2.

Figure 3 illustrates the same tire after some use, whereby the portion of the operative surface between flange 1 and point 4 as well as all the webs 12—14 have been worn out, all in the same degree on account of their relative resistance in relation to the active stresses on the various spots, resulting in a new operative surface $2a$ of substantially the same sloping properties as from origin viz. some 1/20 between the curved corner 3 and point 4 and some 1/10 from that point to the outer edge 5 without formation of a "false flange" at 4.

A similar result will be obtained by stepping the operative surface 2 in a suitable manner with various operative width of the steps reckoned from the flange 1 to the outer edge 5, such as exemplified in Figure 4.

In this figure the stair like steps are designated with 120, 130, 140 while the plain portion between corner 3 and the first step is designated with 20. The steps decrease in width from the plain portion 20 towards the outer edge 5 as also their height as can be seen by the converging of the two dot and dash lines A' and B', the first mentioned line drawn through the outermost corner of the steps, and the last-mentioned line through the innermost corner of same steps.

In Figure 4 the steps 120—140 are shown somewhat inclined inwardly similar to the teeth in a saw but such an inclination is not material, and the steps can be rather parallel also or inclined in the opposite direction.

The most suitable width of the different grooves and webs or steps is to be determined by the quality of the material for the tire, and the hardness, width and shape of the head of the rail, and can easily be found experimentally by the various railways. It should also be determined, if the webs 12—14 or steps 120—140 in wheels without brakeshoes should not be made correspondingly weaker than in wheels with brakeshoes.

The operative surface 2 of the tread up to the first groove 8, Figures 2 and 1, respectively, and the surface 20 up to the first step at point 4 in Figure 4 may also be given a greater strength of resistance against wear by hardening the material for instance with mechanical methods, as the wear of the tread is only to a slight degree due to rolling and sliding friction but is mainly due to compression of the tire material which really precedes the wear proper.

It is therefore advantageous to make in the wheel lathe the parts most exposed to pressure with a slight margin such as indicated by the dotted line E in Figure 2. By means of, for instance, small rollers in a pair of hardened conical rings, that automatically move uniformly over the tires of a wheel pair (in the opposite manner of a tube rolling mill), said surplus material is compressed until the correct tread profile is obtained as shown by the full line 2 in Figure 2.

In this way each circle of the tread with the same diameter will maintain exactly the same Brinell hardness (higher at the foot of the flange 6 than at the grooves) which is absolutely necessary for the wheels of a set of railway wheels or a set of coupled locomotive axles. The material at the foot of the flange 6 should be lease compressible, and that of the tread 2 or 20 proper less compressible than the material on the webs or steps while the material on one "inner" web or step ought to be less compressible than the material on a relatively "outer" web or step.

The most useful and economical result obtainable by the improved tire is, that a harder material can be used for the rails than for the tires. Further it is of the very greatest importance that the improved tire allows the profile of the railhead to be maintained, and single-point contact between tire and rail ensured.

On account of the said higher unit pressure attained by the small rollers or adequate tools during the aforementioned compressing of the operative surface 2 or 20 the compression penetrates the material much farther than is done by the railhead during service.

In this way the object is to attain smaller differences in strength between the outer layer of the tread, where the consistency is stretched above the elastic limit due to the pressure of railhead, and the material underneath which has not been stressed above the elastic limit. In this way it will take a much longer time till the material flakes, and further the wear due to rolling friction is appreciably diminished.

When redressing the tire, it is sufficient to turn away the flange 1 until it obtains its initial height above the surface 2 or 20 as well as to make new grooves 8—11 or steps 120—140 of the same shape as the original grooves or steps.

In all the Figures 1 to 4 inclusive the dot and dash line marked C indicates the radial middle line through the wheel while the dot and dash line passing through point 4 indicates how said point ought to be situated in accordance with this invention (in Figures 2, 3 and 4) and how it usually is situated in ordinary railway wheels (Figure 1). The point D in Figure 1 indicates how in the worn out profile of the ordinary tire the "false flange" gets removed farther off the initial point 4 between the two different slopes of the tread.

What I claim is:

1. In a tire for a flanged wheel for railway vehicles, interruptions in the tread profile running parallel with the flange around the rim, said interruptions forming webs in the tire, increasing in width and height from the outer side of the wheel towards the flange of the tire.

2. In a tire for a flanged wheel for railway vehicles, interruptions in the tread profile running parallel with the flange around the rim, said interruptions forming webs in the tire increasing in width and height from the outer side of the wheel towards the flange of the tire, said webs separated by grooves the width of which decreases in opposite direction as the width of the webs.

3. In a tire for a flanged wheel for railway vehicles, interruptions in the tread profile running parallel with the flange around the rim, said interruptions forming webs in the tire having different hardness so that a web nearer the outer side of the wheel is of a slighter hardness than a web more remote from said outer side.

4. In a tire for a flanged wheel for railway vehicles, interruptions in the tread profile running parallel with the flange around the rim, said interruptions forming webs in the tire having different hardness so that a web nearer the outer side of the wheel is of a slighter hardness than a web more remote from said outer side, said variations in hardness accomplished by treating the tire in a lathe with compressing rollers having a larger compression action on the tire material adjacent the flange of tire than on points more remote thereof.

In testimony whereof I have affixed my signature.

GOTTFRIED F. A. CORTS.